(12) United States Patent
Willson (10) Patent No.: US 6,231,020 B1
(45) Date of Patent: May 15, 2001

(54) SWIVEL DEVICE FOR CABLE CONNECTED ELECTRONIC COMPONENTS

(76) Inventor: James H. T. Willson, P.O. Box 424701, San Francisco, CA (US) 94142

( * ) Notice: Subject to any disclaimer, the term of this patent is extended or adjusted under 35 U.S.C. 154(b) by 0 days.

(21) Appl. No.: 09/196,649

(22) Filed: Nov. 19, 1998

Related U.S. Application Data

(60) Provisional application No. 60/066,130, filed on Nov. 19, 1997.

(51) Int. Cl.$^7$ .................................................. A47B 95/00
(52) U.S. Cl. ...................... 248/349.1; 248/415; 248/922
(58) Field of Search ............................. 248/349.1, 415, 248/131, 922, 51, 52, 144, 145

(56) References Cited

U.S. PATENT DOCUMENTS

| | | |
|---|---|---|
| 3,152,281 | 10/1964 | Blanco . |
| 3,936,026 * | 2/1976 | Hampel et al. .................. 248/349.1 |
| 4,304,385 | 12/1981 | Farouche et al. . |
| 4,547,027 | 10/1985 | Scheibenreif . |
| 4,549,710 | 10/1985 | Prince et al. . |
| 4,589,713 | 5/1986 | Pfuhl et al. . |
| 4,635,894 * | 1/1987 | Sammons .................. 248/349.1 X |
| 4,645,153 | 2/1987 | Granzow et al. . |
| 4,648,574 | 3/1987 | Granlund . |
| 5,243,434 * | 9/1993 | Nodama ........................ 248/922 X |
| 5,632,463 * | 5/1997 | Sung et al. .................. 248/349.1 X |
| 5,749,304 | 5/1998 | Turner . |
| 5,873,557 * | 2/1999 | Schilling et al. ................ 248/349.1 |
| 5,895,022 * | 4/1999 | Kim .............................. 248/349.1 X |

* cited by examiner

Primary Examiner—Ramon O. Ramirez (57) ABSTRACT

A swivel device intended for electronic equipment and having an upper platform that rotates upon a stationary base. The platform is elevated above the base by means of supports, creating a low profile wiring cavity with a cable supporting bottom surface. The cables from the electronic equipment are passed through the cavity in a manner that controls and protects them. In addition, a post located within the wiring cavity controls the cable path so that the cables are not pulled, entangled, or disconnected during rotation of the platform.

19 Claims, 12 Drawing Sheets

SWIVEL DEVICE FOR CABLE CONNECTED ELECTRONIC COMPONENTS

This application claims the benefit of U.S. Provisional Application No. 60/066,130, filed Nov. 19, 1997.

BACKGROUND—FIELD OF THE INVENTION

This invention relates to swivel devices, specifically, swivel devices used to support electronic components and the like having wires, cables or tubes connected to them.

BACKGROUND OF THE INVENTION

In many devices, such as television sets and computer equipment, it is desirable to have easy access to the back of the device to repair it or to connect electric cables. To provide access, it is known to mount such devices on a rotating platform such as a lazy susan so that the device can be turned at least 180 degrees from its operating position. However, rotating such devices, especially those having many cables connected, can cause the cables to be pulled, entangled, or disconnected from the device. It is desirable, and it is the object of this invention, to provide a rotating platform that can be turned at least 180 degrees without pulling or entangling the cables, to expose the back of the device and thereby provide access to cables and cable connections.

BRIEF SUMMARY OF THE INVENTION

This invention is a swivel device intended for electronic equipment and having an upper platform that rotates upon a stationary base. The platform is elevated above the base by means of supports, creating a wiring cavity that is low profile and of a shape similar to a low-profile parallelepiped.

The cables from the electronic equipment are routed through the cavity in a manner that controls and protects them. The invention can be made substantially open on the sides, allowing the user to easily view, install, and replace the cables. A stop prohibits the platform from rotating more than 360 degreees with respect to the base.

The cables must be at least as long as the depth of the platform, as measured from front to back. A post located within the wiring cavity controls the cable path so that the cable service length, being the cable length from the cavity entrance point to the cavity exit point, is substantially constant during rotation of the platform.

BRIEF DESCRIPTION OF THE DRAWINGS

Example embodiments are described in the detailed description and shown in the drawings as follows.

DETAILED DESCRIPTION OF THE INVENTION

Terminology

The following terms are used in this document and have specific meanings:

The platform. The upper surface of the swivel device.

Zero degree position. This is the normal operating position. For computer equipment, the video screen or the front panel face the operator in this position.

180 degree position. This is the service position. In this position, the back of the computer faces the operator, allowing access to cables, replaceable computer cards, and the like.

Cable entry point. The area at which the cable from the computer equipment enters the invention. The cable entry point rotates with the platform.

Cable exit point. The area near the back of the invention from which the cable emerges and then travels to the outside world. The cable exit point is stationary.

Cable service length. The cable length from the cable entrance point to the cable exit point.

Component. Used interchangeably with electrical equipment.

Description of Preferred Embodiment

Figure 1:
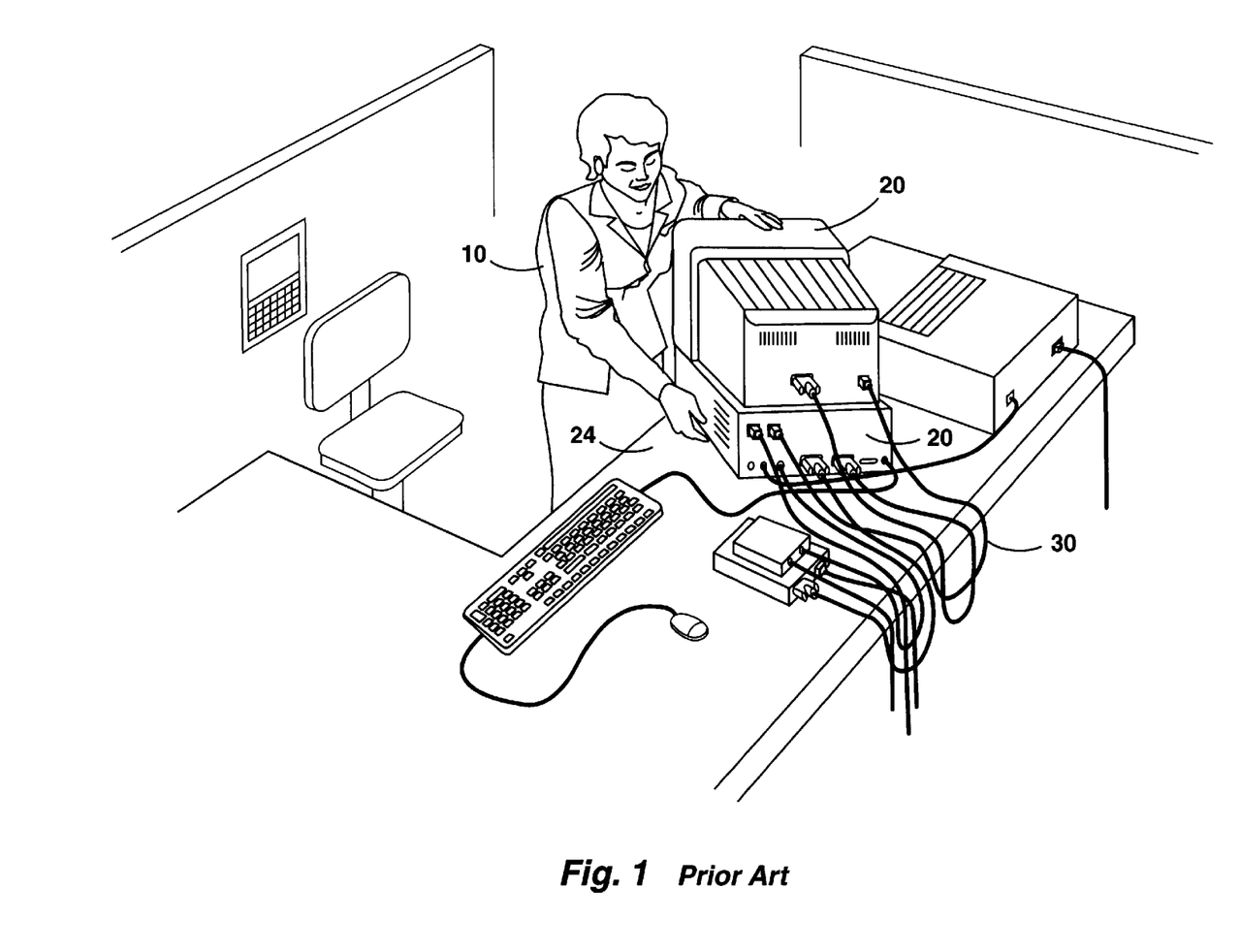
FIG. 1 is an orthogonal view showing the prior art.

This invention is a swivel device for cable-connected equipment. FIG. 1 shows the prior art, wherein an operator 10 attempts to gain access to the back of the electrical components 20, in this case a computer system, by sliding them across the work surface 24. There are numerous cables 30 attached, which may be pulled, damaged, or tangled during this operation.

Figure 2:
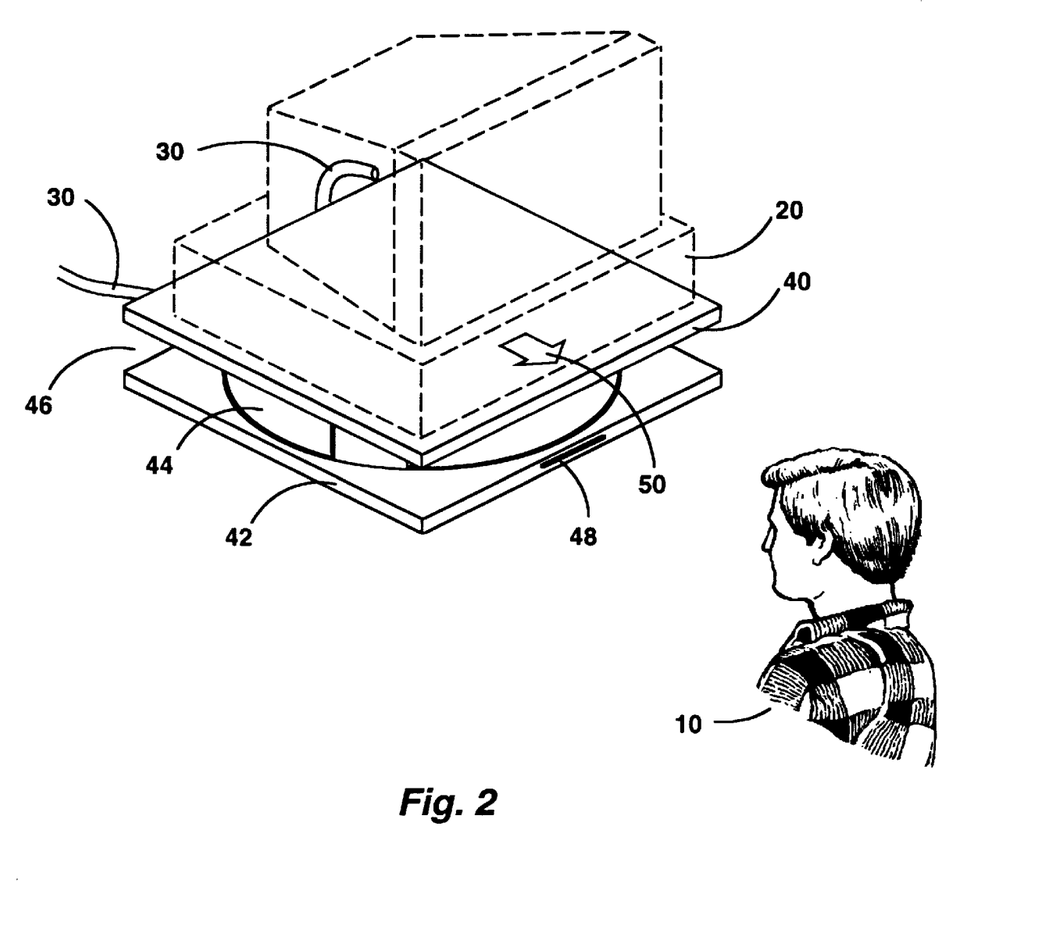
FIG. 2 is is an orthogonal view of the preferred embodiment resting in the zero position.
Figure 3:
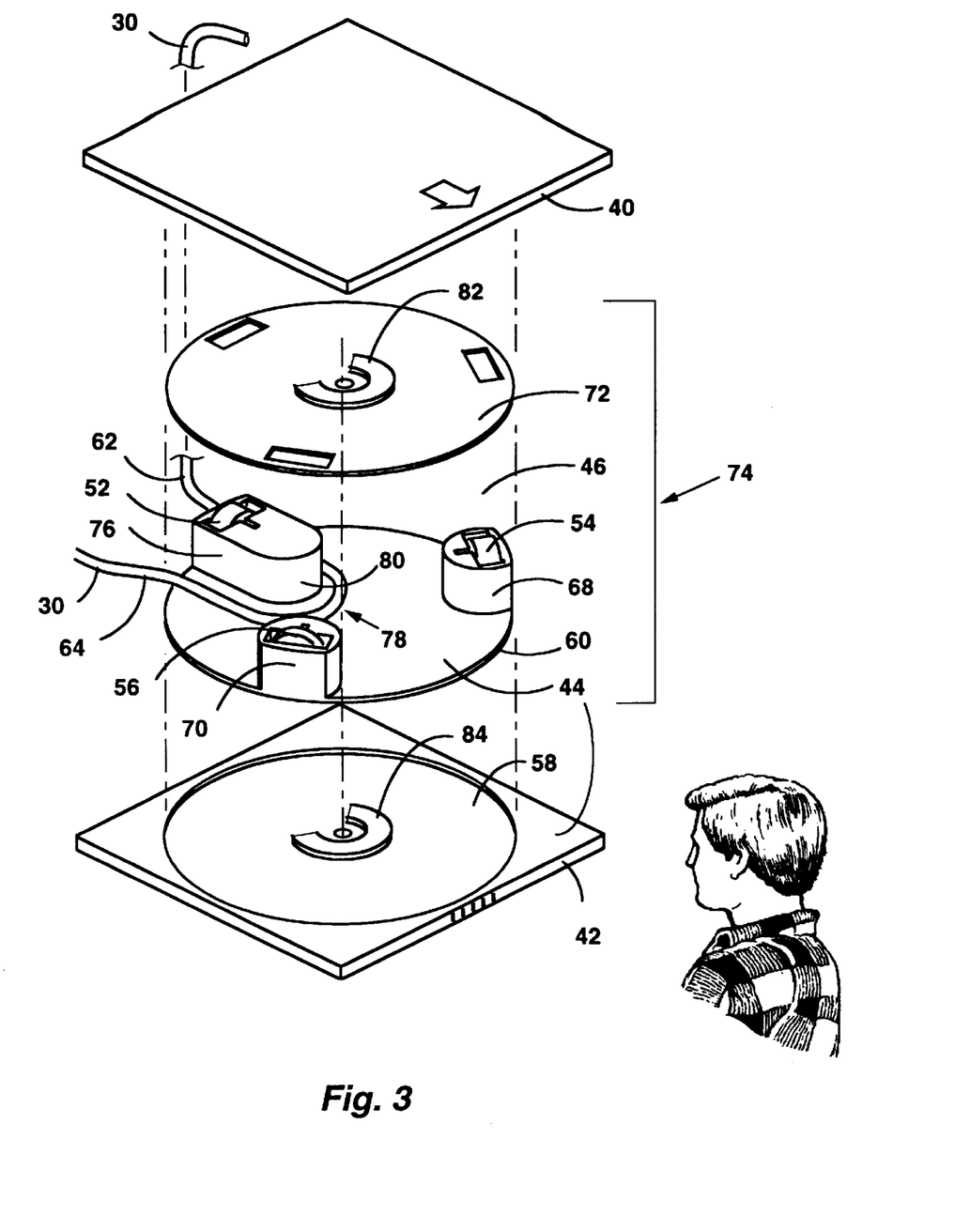
FIG. 3 is an exploded view showing the preferred embodiment in the zero position.
Figure 4:
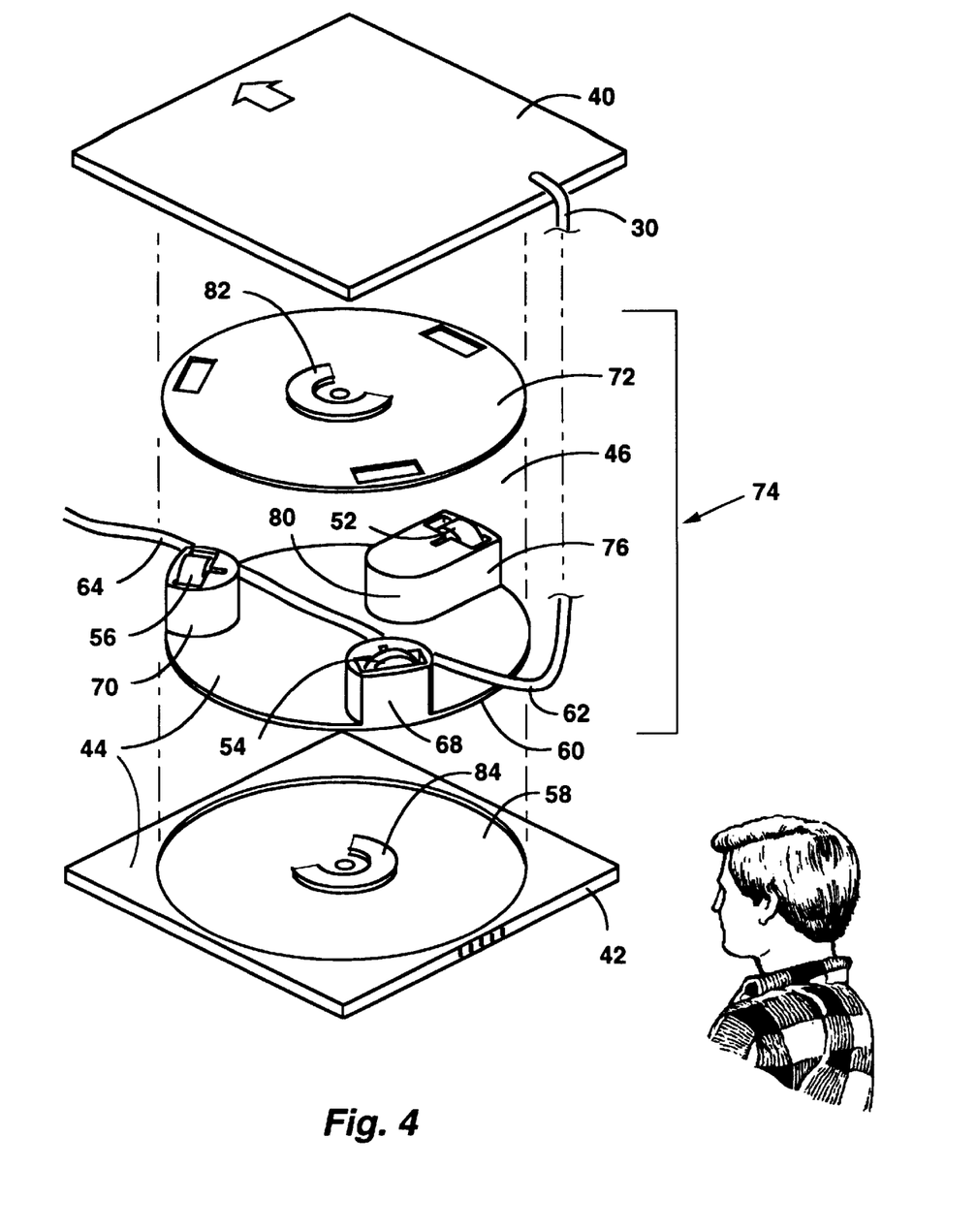
FIG. 4 is an exploded view showing the preferred embodiment in the 180 position.
Figure 5:
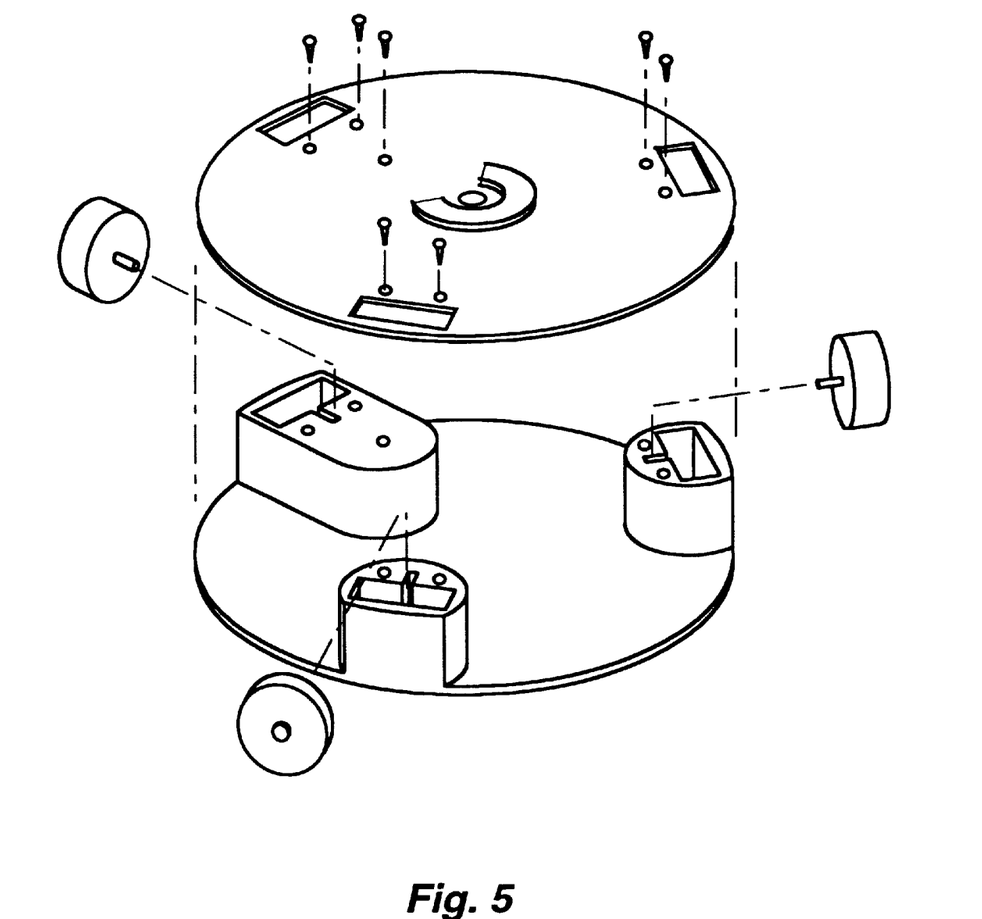
FIG. 5 is an exploded view showing the preferred embodiment in the zero position.

FIGS. 2 and 3 show a preferred embodiment of this invention in the zero position (the operating position). FIG. 4 shows the invention in the 180 position (the service position). For all embodiments shown herein, the rotating convention is that the platform, when viewed from above, is turned clockwise to attain the service position and counter-clockwise to restore it to the operating position. One skilled in the art will see that other embodiments are possible.

The invention comprises a platform 40 that rests rotatably upon a stationary base 42, the platform being spaced a predetermined height above a cable supporting surface 44. The platform and base define a wiring cavity 46 substantially the shape of a low-profile parallelepiped.

To assist the operator in setting up the invention, the base 42 may have a marking 48 indicating the front, the front being the side facing the user. The platform may also have a marking 50 indicating the side facing the user in the normal operating position. The platform marking assists the operator in orienting the equipment when placing it on the platform.

The swivel bearing assembly consists of a plurality of load bearing rollers 52, 54, and 56. The rollers travel on a race 58 on the stationary base 42. The roller diameter defines the height of the wiring cavity, and must be sufficient to allow unobstructed passage of a cable through the cavity. In this embodiment, the rollers are approximately 2.5 inches in diameter, resulting in a cavity height of approximately 2.25 inches.

In this embodiment, the cable supporting surface 44 consists of two separate surfaces: a rotating lower disk 60 and the upper part of the base 42 around the periphery of the lower disk. The cables 30 traverse the cable supporting surface from the cable entry point 62 to the cable exit point 64. The path length of the cable traversing the invention is referred to as the cable service length. The cables must be at least as long as the cable service length.

A post 76 and columns 68 and 70 are attached to the lower disk 60 and are spaced uniformly around the perimeter of the disk. The purpose of the columns is to contain the rollers 52, 54, and 56 and to locate them at 120 degree intervals. The columns are not load bearing. An upper disk 72 is attached to the columns, completing the center assembly 74. A purpose of the center assembly is to rotatably fasten the platform to the base.

In this embodiment, the rollers can be shown to travel at one half the angular rotation of the platform as viewed from the top. Therefore, the center assembly 74, which is urged to rotate by the rollers, also rotates at one-half the angle of the platform.

FIGS. 3 and 4 show a post 76 of predetermined shape and position that controls the cables 30. The post is positioned a predetermined distance from the axis of rotation 78 of the invention. The post has a smooth surface 80 around which the cables wrap in the normal operating position. The post substantially contacts the center area of the cable passing through the invention.

A cable 30 originating at the back of the equipment 20 (shown in FIG. 1) travels the following path: The cable passes downward from the equipment and enters the wiring cavity 46 between the platform 40 and the cable support surface 44. The cable enters the cavity at a cable entrance point 62.

When the platform 40 is in the operating position (FIG. 3), the cable 30 travels in a substantially U-shaped path in a horizontal plane, and then travels toward the back of the base 42. The cable then exits the cavity 46 at a stationary cable exit point 64.

When the platform 40 is in the service position (FIG. 4), the cable 30 travels in a nominally straight path in a horizontal plane toward the back of the base 42. The cable then exits the cavity at the previously described exit point 64.

In this embodiment, the post 76 is approximately 1.75 inches from the axis of rotation 78 of the invention, resulting in a substantially constant cable service length throughout the rotation of the platform. The cable service length is equal to the diameter of the arc swept out by the cable entrance point 62 during rotation of the platform 40. Since cable service length is substantially constant, there is negligible pulling on the cable 30 throughout the range of rotation. It has been determined experimentally that for flexible cables, this arrangement also produces negligible sideways movement of the cables at the cable exit point 64 when the platform 40 is rotated; therefore, cable clamps are not typically required. The precise position of the cable exit point is determined by the cable's direction of travel as it passes to the destination device.

FIGS. 3 and 4 also show stops 82 and 84 that limit the rotation of the platform. The stops may limit the rotation of the platform 40 at zero degrees and at 180 degrees, or they may be configured for a wider range, nominally minus 15 degrees and 180 degrees. The wider range allows the equipment to be rotated left and right through a 30 degree angle during operation (or plus and minus 15 degrees using the terminology in this document). This capability allows for modest adjustment of viewing angle about the vertical axis for video monitors or other display devices.

To one skilled in the art, a number of stop embodiments are possible. In this embodiment, two sets of stops 82 and 84 are used. Each stop mechanism permits a platform 40 travel of nominally 90 degrees, resulting in a total travel of 180 degrees. Alternatively, each stop mechanism may be set to 97.5 degrees, providing plus and minus 15 degrees of travel in the normal operating position to allow adjustment of monitor viewing position.

For this embodiment, the invention is operated as follows: The cables 30 must be unattached at one end for installation, and they are most easily installed in the 180 position, at which time the operator may pass the cable free ends through the invention in a substantially straight line. The operator then returns the platform 40 to the zero position, which automatically guides the cables around the post 76. This operation can be performed while sitting down.

Description of Additional Embodiments

Figure 6:
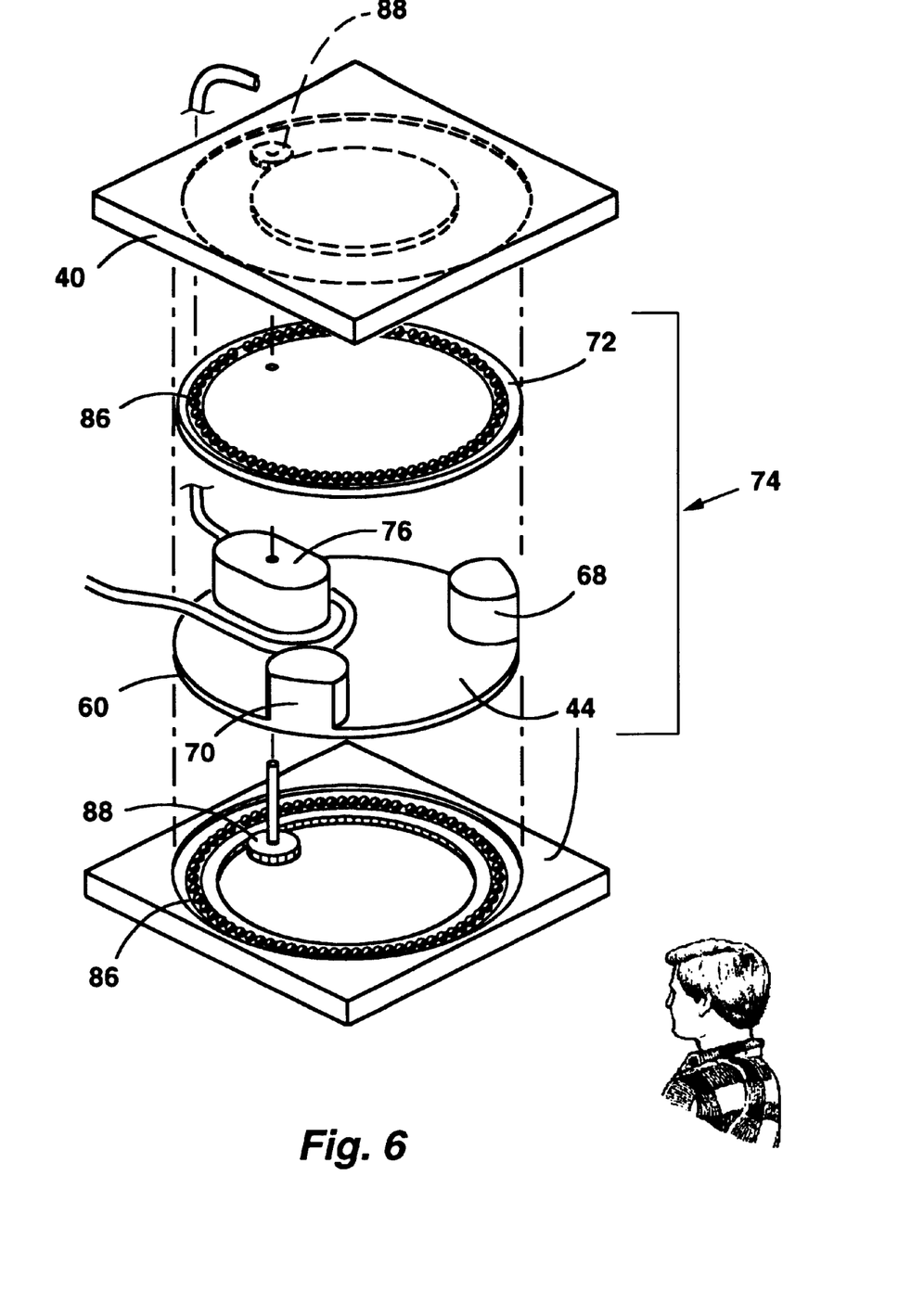
FIG. 6 is an exploded view of Embodiment 2 in the zero position.
Figure 7:
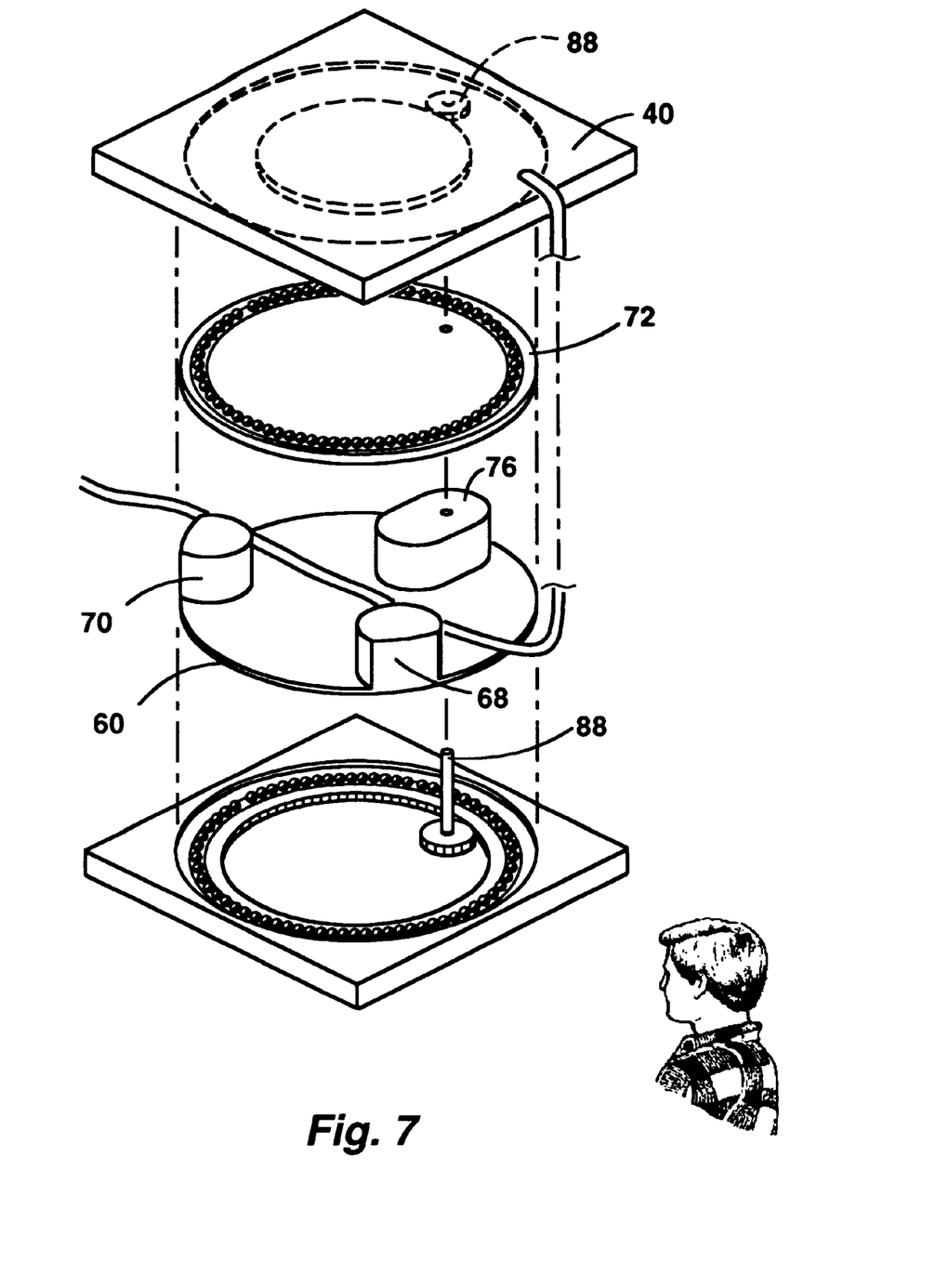
FIG. 7 is an exploded view of Embodiment 2 in the 180 position.

FIGS. 6 and 7 show another embodiment of this invention, herein labeled Embodiment 2. The rotating means is implemented by ball bearings 86 instead of rollers. This embodiment has the following similarities to the preferred embodiment: The cable supporting surface 44 is substantially a rotating lower disk 60. Post 76, columns 68 and 70, the upper disk 72, and the lower disk 60 comprise a center assembly 74. As previously described, a purpose of the center assembly is to rotatably connect the platform to the base. However, a significant difference in this embodiment is that the center assembly is load-bearing.

As in the preferred embodiment, the center section rotates at one-half the angle of rotation of the platform 40. A gear mechanism 88 may be included to accurately locate the rotational position of the center assembly.

Figure 8A:
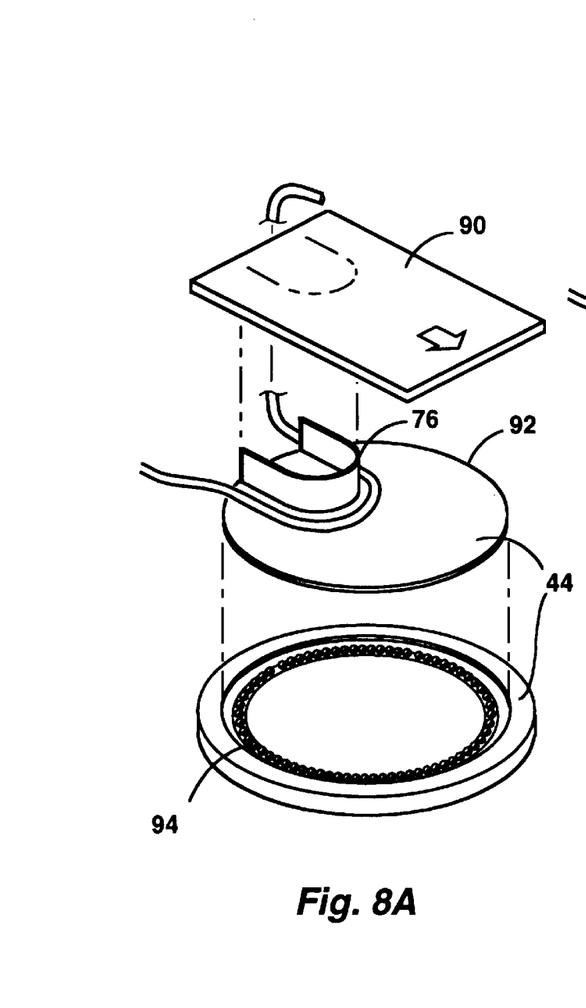
FIG. 8A is an exploded view of Embodiment 3 in the zero position.
Figure 8B:
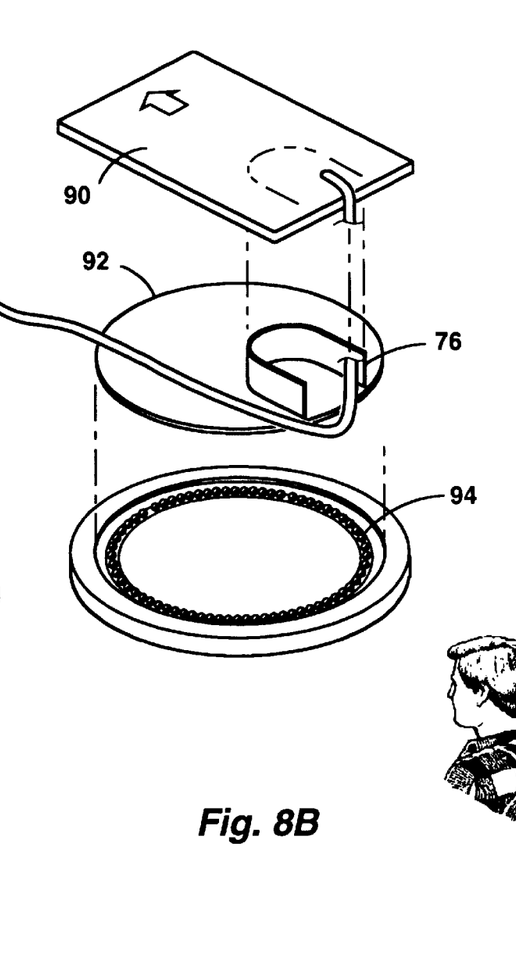
FIG. 8B is an exploded view of Embodiment 3 in the 180 position.

FIGS. 8A and 8B show another embodiment of this invention, herein labeled Embodiment 3. In this embodiment, the post 76 supports the computer by cantilever effect and no additional supports are used. As in the preferred embodiment, the cable supporting surface 44 is substantially a rotating circular plate 92. The post 76 is fabricated from sheet steel rolled into a "U" shape. The upper part is welded to a strengthening plate 90 in the upper deck and the lower part is welded to a circular plate 92 that rests on the bearing assembly 94.

This embodiment differs from the preferred embodiment in that the cable supporting surface and the post rotate at the same angle as the Platform.

In this embodiment, cable loading is more convenient, as it is not necessary to disconnect the cables at one end. Further, with this embodiment, cable loading can be performed at any degree of rotation.

Figure 9A:
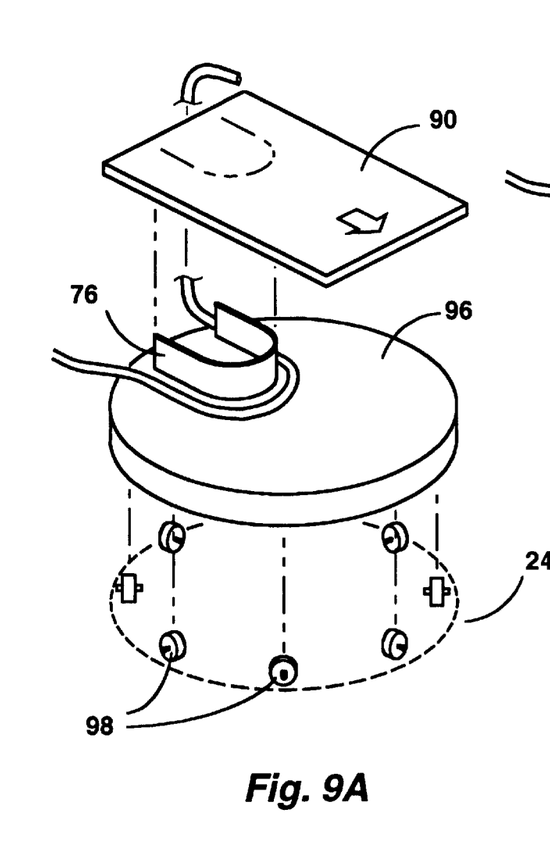
FIG. 9A is an exploded view of Embodiment 4 in the zero position.
Figure 9B:
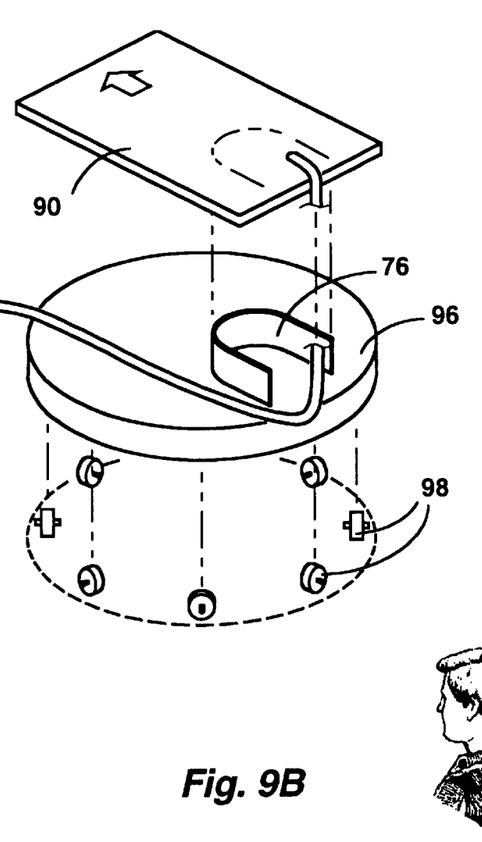
FIG. 9B is an exploded view of Embodiment 4 in the 180 position.

FIGS. 9A and 9B show another embodiment of this invention, herein labeled Embodiment 4. As in the previous embodiment, the post 76 supports the computer by cantilever effect and no additional supports are used. The post is fabricated from sheet steel and the upper part is welded to a strengthening plate 90 in the upper deck. The lower part is welded to a drum-shaped disk 96 having a downward-facing cavity that contains a plurality of rollers 98. The rollers rest on the work surface 24, the work surface for this embodiment being functionally equivalent to a base. The rollers are circularly arranged and constrain the Platform (strengthening plate 90) to a rotating motion.

As in the previous embodiment, the cable supporting surface and the post rotate at the same angle as the Platform. In operation, this embodiment also facilitates loading cables, and it is not necessary to disconnect cables at either end.

Figure 10A:
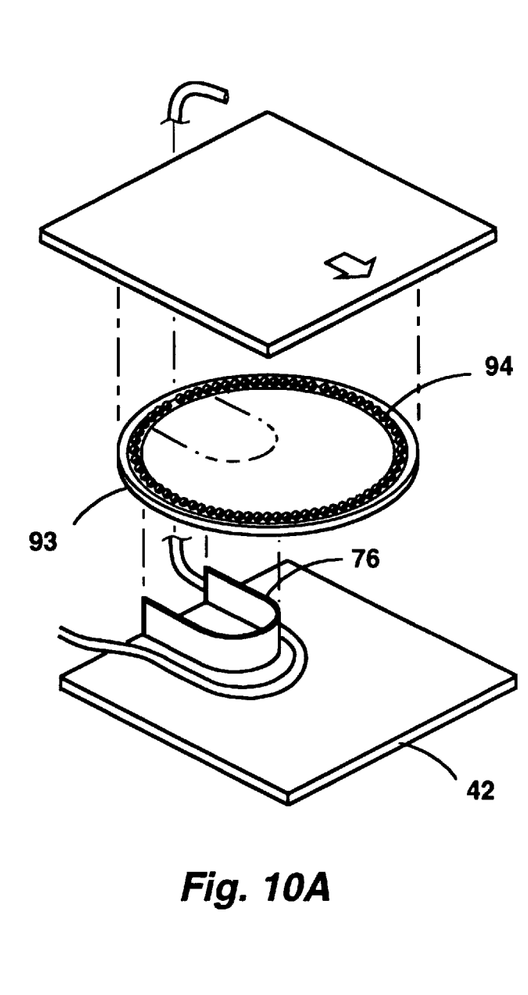
FIG. 10A is an exploded view of Embodiment 5 in the zero position.
Figure 10B:
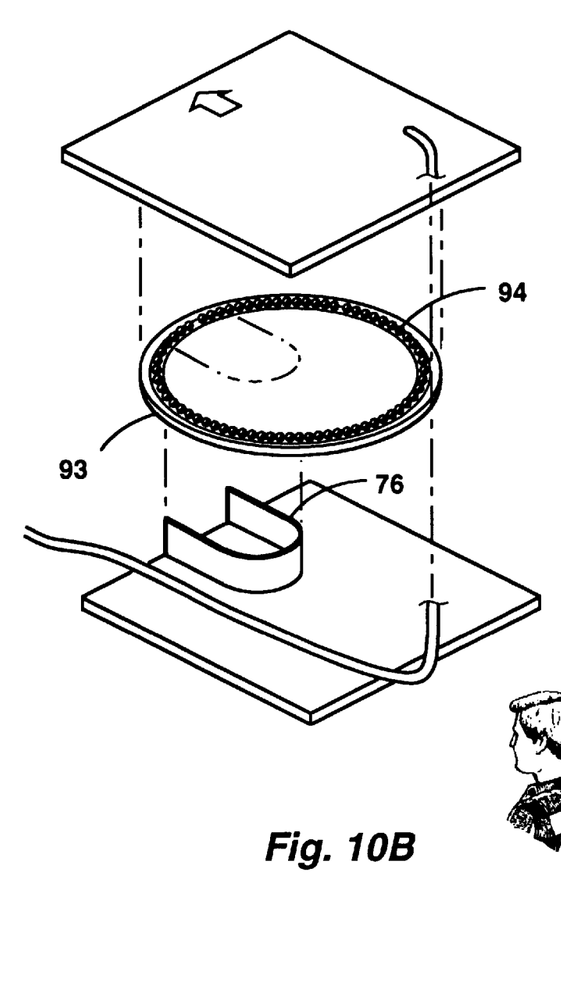
FIG. 10B is an exploded view of Embodiment 5 in the 180 position.
Figure 11:
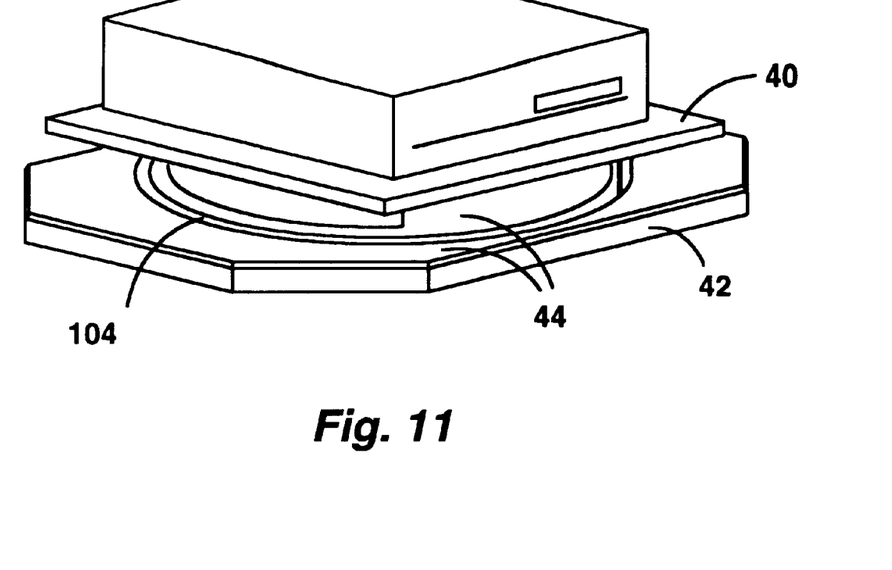
FIG. 11 is an isometric view of Embodiment 6 in the zero position.
Figure 12:
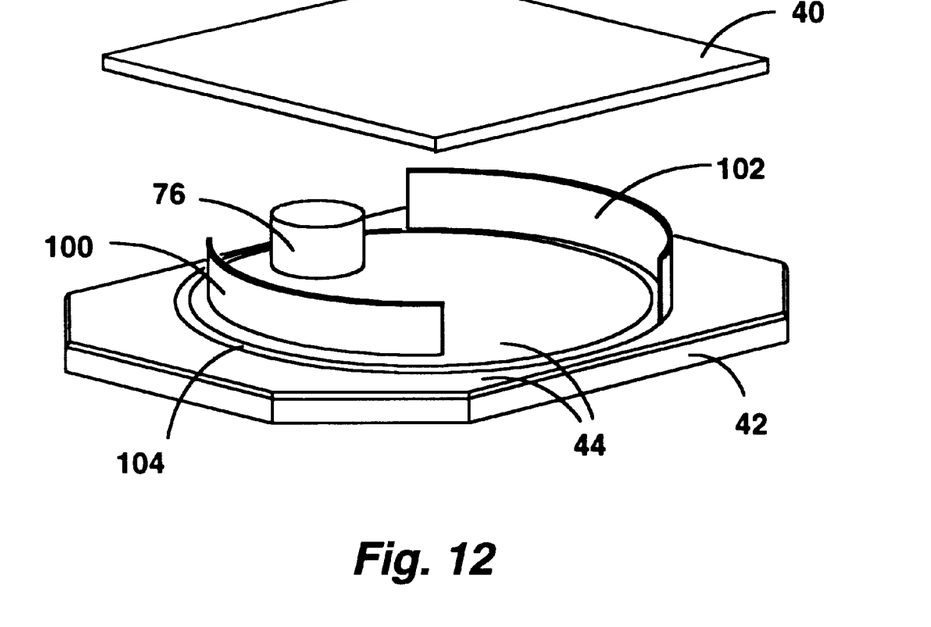
FIG. 12 is an exploded view of Embodiment 6 in the zero position.
Figure 13A:
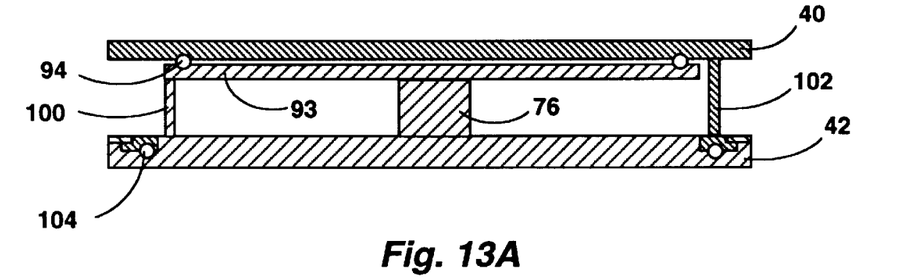
FIG. 13A is a front cross-section view of Embodiment 6 in the zero position.
Figure 13B:
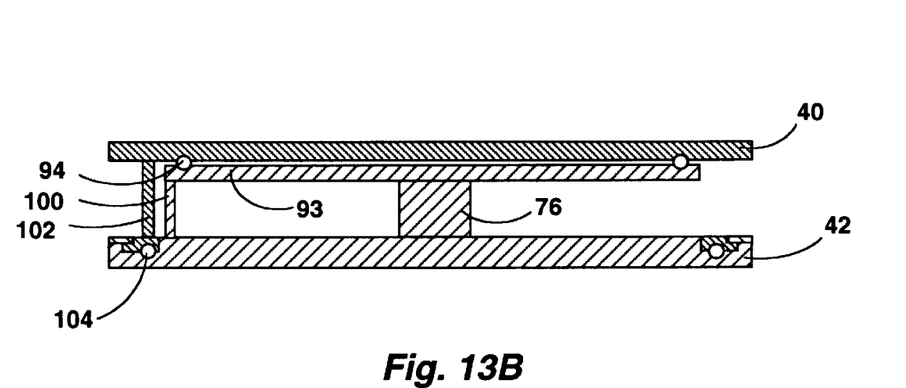
FIG. 13B is a front cross-section view of Embodiment 6 in the 180 position.

FIGS. 10A and 10B show another embodiment of this invention, herein labeled Embodiment 5. In this embodiment, the post 76 supports the computer by cantilever effect and no additional supports are used. The post is fabricated from sheet steel and the upper part is welded to a circular plate 93 that supports the bearing assembly 94. The lower part is welded to the base 42. In this embodiment, the cable supporting surface is the same as the base and is stationary.

FIGS. 11, 12, 13A and 13B show another embodiment of this invention, herein labeled Embodiment 6. Both figures are shown in the zero position. In this embodiment, the base 42 has a stationary surface 44 traversed by the cable 30 (not shown). The platform 40 rotates upon a ball bearing assembly 94 and is supported by one curved stationary support 100 and one curved movable support 102. The ball bearing assembly rests on a support plate 93, which is attached to and supported by the stationary support 100. Additionally, the platform is attached to and supported by a curved, rotatable support 102. This support rests on a ball bearing assembly 104 which further rests on the base 42. In the operating position, the curved supports are opposed to one another as viewed from the top; in the service position, they are in a nesting configuration. In the service position, the platform is supported by cantilever effect; in the operating position, it is not.

This embodiment is shown with a post 76; however, clamps may be used instead as the cable controlling means. In this embodiment, clamps at the cable entrance point 62 (not shown) and the cable exit point 64 (not shown) could control the cable position and ensure that the cable service length in the normal operating position is equal to the service length in the service position.

In summary, these embodiments provide a stable rotating platform for computer equipment that may be rotated 180 degrees for servicing, and may provide approximately 30 degrees of adjustment in the normal position for optimizing viewing angle. The horizontal cable path results in a low profile swivel device.

The embodiments of the invention described above are to be regarded as examples only and a number of other modifications and embodiments are possible within the scope of the appended claims.

I claim:

1. A swivel device for cable-connected equipment comprising a platform that rests rotatably upon a stationary base, a cable-supporting surface above the base, said platform being spaced above said cable supporting surface, said swivel device including a cable entrance point located near the perimeter of the swivel device, said cable entrance point describing an arc during rotation of said platform, and cable controlling means for causing a cable service length to be substantially constant during rotation of said platform and equal to the diameter of said arc, said swivel device having a normal operating position and a service position.

2. The device of claim 1, wherein the cable controlling means is a post of predetermined shape and position, said post providing a smooth surface around which cables wrap in the normal operating position, said post being positioned a predetermined distance from the central axis of said swivel device such that said cable service length in the normal operating position is equal to said cable service length in the service position.

3. The apparatus of claim 1, wherein the cable controlling means is a clamp means such that said cable service length in the normal operating position is equal to said service length in the service position.

4. The device of claim 1, wherein the cable controlling means is a post of predetermined shape and position, said post bisecting the cable service length such that said cable service length in the normal operating position is equal to said cable service length in the service position.

5. A swivel device for cable-connected equipment, comprising:
    a stationary base;
    a platform rotatable in relation to said stationary base, said platform having a rate of rotation;
    a support member between said platform and said stationary base; and
    a wiring cavity between said platform and said stationary base, said wiring cavity having a lateral cable-entrance point and a lateral cable-exit point, said swivel device further including cable-controlling means for eliminating pulling and twisting forces on a cable passing through said wiring cavity, the cable coupled at both ends to the cable-connected equipment, said swivel device having a normal operating position and a service position.

6. The swivel device of claim 5 wherein, when said swivel device in said service position, said cable-controlling means is oriented to provide a straight path for the cable and to enable installation and removal of the cable to and from said wiring cavity without decoupling the cable from the cable-connected equipment.

7. A swivel device for cable-connected equipment comprising;
    a stationary base;
    a platform rotatable in relation to said stationary base, said platform having a rate of rotation;
    a center assembly rotatable in relation to said stationary base at a fraction of said rate of rotation; and
    a wiring cavity defined between said platform and said stationary base, said wiring cavity having a lateral cable-entrance point and a lateral cable-exit point.

8. The device of claim 7, wherein the platform is rotatably supported only by the stationary base.

9. The device of claim 7, wherein the platform is rotatably supported by the center assembly and the center assembly is rotatably supported by the stationary base.

10. The device of claim 7 further including cable controlling means for causing a cable service length disposed inside said wiring cavity to be substantially constant during rotation of said platform and equal to the diameter of an arc swept out by the lateral cable entrance point.

11. The device of claim 10, wherein the cable controlling means is a post of predetermined shape and position, an axis of said post substantially bisecting the cable service length such that said cable service length in the normal operating position is equal to said cable service length in the service position.

12. The device of claim 10, wherein the cable controlling means is a post of predetermined shape and position, said post providing a smooth surface around which cables wrap in the normal operating position, said post being positioned a predetermined distance from the central axis of said swivel device such that said cable service length in the normal operating position is equal to said cable service length in the service position.

13. The device of claim 7 further including a stop means limiting rotation of said platform to substantially 180 degrees.

14. The device of claim 7 further including a stop means limiting rotation of said platform to substantially 195 degrees, allowing adjustment of viewing angle in the operating position.

15. The swivel device of claim 7 further including a gear assembly, said platform rotatably coupled with said stationary base through said gear assembly.

16. A swivel device for cable-connected equipment, comprising:

a stationary base;

a platform rotatable in relation to said stationary base, said platform having a rate of rotation;

a support member between said platform and said stationary base; and a wiring cavity between said platform and said stationary base, said wiring cavity being defined between said platform and said support member, said wiring cavity having a lateral cable-entrance point and a lateral cable-exit point.

17. A swivel device for cable-connected equipment, including:

a base;

a platform rotatable in relation to said base; and a wiring cavity between said platform and said base, said wiring cavity confining a length of cable coupled to the cable-connected equipment, said length of cable lying substantially in a plane interposed between the base and the platform.

18. The swivel device of claim 17, having a cable controlling means positioned to provide a straight path for said length of cable when said swivel device is in a service position.

19. The swivel device of claim 17 having a cable controlling means positioned to provide an arcuate path for said length of cable when said swivel device is in a normal operating position.

* * * * *